United States Patent
Vollmer

(10) Patent No.: US 11,482,893 B2
(45) Date of Patent: Oct. 25, 2022

(54) MATERIAL LAYER FOR HIGH ROTATIONAL SPEEDS

(71) Applicant: Siemens Aktiengesellschaft, Munich (DE)

(72) Inventor: Rolf Vollmer, Gersfeld (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/259,392

(22) PCT Filed: Jul. 10, 2019

(86) PCT No.: PCT/EP2019/068478
§ 371 (c)(1),
(2) Date: Jan. 11, 2021

(87) PCT Pub. No.: WO2020/011821
PCT Pub. Date: Jan. 16, 2020

(65) Prior Publication Data
US 2021/0281126 A1  Sep. 9, 2021

(30) Foreign Application Priority Data
Jul. 13, 2018 (EP) .................................. 18183453

(51) Int. Cl.
*H02K 1/02* (2006.01)
*H02K 1/27* (2022.01)
(Continued)

(52) U.S. Cl.
CPC ............... *H02K 1/02* (2013.01); *H02K 1/276* (2013.01); *H02K 15/03* (2013.01); *H02K 29/03* (2013.01)

(58) Field of Classification Search
CPC .......... H02K 1/02; H02K 1/276; H02K 15/03; H02K 29/03
(Continued)

(56) References Cited

U.S. PATENT DOCUMENTS

| 6,543,132 B1 | 4/2003 | Krueger et al. |
| 2009/0045689 A1* | 2/2009 | Haruno .................. H02K 15/03 310/156.56 |

(Continued)

FOREIGN PATENT DOCUMENTS

| CN | 102195380 A | 9/2011 |
| CN | 107401554 A | 11/2017 |

(Continued)

OTHER PUBLICATIONS

PCT International Search Report and Written Opinion of International Searching Authority dated Aug. 28, 2019 corresponding to PCT International Application No. PCT/EP2019/068478 filed Oct. 7, 2019.

*Primary Examiner* — John K Kim
(74) *Attorney, Agent, or Firm* — Henry M. Feiereisen LLC

(57) ABSTRACT

In a method for producing a material layer for a rotor of a dynamoelectric rotary machine, a first suspension with binding agent and solid particles is applied through a first screen onto a base to form a first green body, thereby reproducing a first region of a first material with a first degree of strength. A second suspension with binding agent and solid particles is applied through a second screen onto a base to form an annular second green body concentrically to a layer center, thereby reproducing a second region of a second material with a second degree of strength being higher than the first degree of strength. The first and second green bodies are joined such as to form a material recess substantially at a layer center. A permanent material bond of the first and (Continued)

second green bodies and the solid particles is created by heating and/or by compression.

11 Claims, 4 Drawing Sheets

(51) Int. Cl.
    *H02K 15/03*     (2006.01)
    *H02K 1/276*     (2022.01)
    *H02K 29/03*     (2006.01)

(58) Field of Classification Search
    USPC .................................................... 310/156.56
    See application file for complete search history.

(56) References Cited

U.S. PATENT DOCUMENTS

| | | | | |
|---|---|---|---|---|
| 2009/0277666 | A1* | 11/2009 | Yamauchi | C08G 18/8064 174/120 SR |
| 2011/0116961 | A1 | 5/2011 | Akbari et al. | |
| 2012/0014823 | A1* | 1/2012 | Riedl | H02K 15/02 29/598 |
| 2012/0229005 | A1* | 9/2012 | Tominaga | H02K 11/38 310/68 B |
| 2012/0274157 | A1* | 11/2012 | Watanabe | H02K 11/40 310/43 |
| 2014/0241914 | A1* | 8/2014 | Ojima | F04D 19/04 310/156.01 |
| 2016/0079832 | A1* | 3/2016 | Schneider | H02K 15/03 29/598 |
| 2016/0126813 | A1* | 5/2016 | Fubuki | H02K 15/03 29/598 |
| 2017/0338699 | A1 | 11/2017 | Salahun et al. | |
| 2018/0019630 | A1 | 1/2018 | Ahrens et al. | |
| 2018/0138763 | A1* | 5/2018 | Nakamura | H02K 7/14 |
| 2018/0358846 | A1* | 12/2018 | Baba | H02K 21/16 |

FOREIGN PATENT DOCUMENTS

| | | |
|---|---|---|
| DE | 10 2009 042 607 A1 | 3/2011 |
| DE | 10 2015 206 100 A1 | 10/2016 |
| RU | 2566512 C2 | 10/2015 |
| WO | WO 2013/126546 A1 | 8/2013 |

\* cited by examiner

MATERIAL LAYER FOR HIGH ROTATIONAL SPEEDS

CROSS-REFERENCES TO RELATED APPLICATIONS

This application is the U.S. National Stage of International Application No. PCT/EP2019/068478, filed Jul. 10, 2019, which designated the United States and has been published as International Publication No. WO 2020/011821 A1 and which claims the priority of European Patent Application, Serial No. 18183453.2, filed Jul. 13, 2018, pursuant to 35 U.S.C. 119(a)-(d).

BACKGROUND OF THE INVENTION

The invention relates to a material layer and a method for producing such a material layer.

Dynamoelectric rotary machines use sheets of a magnetically soft material in their laminated cores in order to reinforce magnetic fields generated by permanent magnets and/or electromagnets. At present, sheets for laminated cores are punched or cut out of large rolled sheets.

The disadvantage is that sheets with good magnetic properties only have a low degree of strength. This limits the maximum rotational speed of the machine. Therefore, producers of dynamoelectric rotary machines always have to consider which is the more important property for the machine in question.

Sheets having both good magnetic properties and a high degree of strength are not available.

The object underlying the invention is to improve a dynamoelectric rotary machine and hence increase the maximum rotational speed of the dynamoelectric rotary machine.

SUMMARY OF THE INVENTION

The object is achieved a material layer for a rotor of a dynamoelectric rotary machine with a rotational direction about a rotational axis arranged in a layer center of the material layer, wherein the material layer has a material recess arranged substantially at the layer center, wherein the material layer has a first region, wherein the first region has a first material with a first degree of strength, wherein the material layer has a substantially annular second region arranged concentrically to the layer center, wherein the second region has a second material with a second degree of strength higher than the first degree of strength, wherein the first material and the second material are connected with a material bond.

The object is further achieved by a material layer structure for a rotor of a dynamoelectric rotary machine, a method for producing a material layer, a method for producing a material layer structure for a rotor of a dynamoelectric rotary machine and by a dynamoelectric rotary machine having such a material layer structure.

The dynamoelectric machine can be operated as a generator or as a motor.

The material layer advantageously has the previous functions of a sheet in a rotor laminated core and performs the tasks of a sheet.

Advantageously, an outline of the material layer substantially corresponds to the outline of a sheet of a conventional dynamoelectric rotary machine.

A material layer structure has a plurality of material layers arranged one above the other.

The material layer structure advantageously has the previous functions of a rotor laminated core and performs the tasks of a rotor laminated core of a conventional dynamoelectric rotary machine.

The material layer preferably has a substantially circular material recess arranged substantially at the layer center. In other words: the material recess is preferably arranged concentrically at the layer center.

The first region preferably indicates a shape of an outer circumference of the material layer at its radial end. The outer circumference can have different shapes. The outer circumference can, for example, be round or have a flower shape (see description of the figures).

The second region preferably adjoins the material recess arranged at the layer center.

On its outer circumference, the second region preferably adjoins an inner circumference of the first region, the first region preferably adjoins the outer circumference of the second region on its inner circumference.

The material layer is preferably manufactured by means of an additive manufacturing process.

The material layer is preferably manufactured by means of screen printing.

In one advantageous embodiment of the invention, the second material has a tensile strength of at least 800 MPa, preferably at least 1000 MPa.

The maximum tensile strength of the second material is preferably 3800 MPa (for example high-speed steel).

The first material preferably has a tensile strength of between 200 MPa and 500 MPa.

Tool steels have a tensile strength of at least 1000 MPa for example.

Tensile strengths of tool steels are preferably between 1500 MPa and 4000 MPa.

In one advantageous embodiment of the invention, the first material has a first magnetic permeability, in particular $\mu r > 50$ and the second material has a second magnetic permeability lower than the first magnetic permeability, in particular $\mu r < 5$.

The second magnetic permeability is preferably lower than the first permeability. A high and suitable permeability is preferably between 300 and 1000.

In other words, this means: the first region preferably has a high magnetic permeability, but its degree of strength is not very high. The second region preferably does not have an excessively high magnetic permeability, but its degree of strength is very high.

In a further advantageous embodiment of the invention, the material layer has a layer thickness of 0.5 to 500 µm.

The material layer preferably has a layer thickness of 10 to 100 µm. This embodiment ensures a stable material layer.

In a further advantageous embodiment of the invention, a transition from the first region to the second region is abrupt.

The second region is preferably annular.

In a further advantageous embodiment of the invention, the material layer has an insulation material on at least one layer side, preferably on both layer sides.

In a further advantageous embodiment of the invention, the material layers have a coating.

In a further advantageous embodiment of the invention, the material layers have baking varnish as a coating.

In a further advantageous embodiment of the invention, the insulation material is the coating.

The material layer and the insulation material and/or the coating are preferably connected with a material bond.

Since the material layers only have a very low layer thickness, eddy current losses are significantly reduced. This is because an eddy current can only develop within the layer thickness of the material layer as a result of which the eddy current strength is significantly reduced with such thin material layers.

The insulation between the individual material layers prevents the eddy currents from overlapping to form large lossy eddy currents.

This inter alia has the following advantage: within a temperature class and at the same rotational speed, a machine with a material-layer-structure rotor according to the invention heats up to a lesser degree than a conventional machine with a laminated-core rotor. In other words: at the same rotational speed, a machine with a material-layer-structure rotor is coder than a machine with a laminated-core rotor.

Hence, the rotational speed can be increased up to the maximum permissible temperature of the respective temperature class. Therefore, the power provided is higher, According to P M-n, the power P increases proportionally with the rotational speed n while the torque M remains constant.

Moreover, due to the high degree of strength in the second region, the maximum rotational speed is not limited.

Conversely, this means: if the machine is to provide a specific power, a lower temperature class can be used with a machine with material-layer-structure rotor than with a machine with a laminated-core rotor. This can reduce costs, in particular for insulation materials and cooling.

The material layers according to the invention are preferably very thin and—unlike conventional sheets—cannot be cut out or punched out of large rolled plates of soft magnetic material. In conventional manufacturing of large sheets by rolling, it is not possible to manufacture large sheets thinner than 100 µm.

However, the above-described thin material layers can be produced by means of additive production.

Moreover, additive production avoids the usual unavoidable waste when the sheets are cut out or punched out of the large sheets. In particular, there is no waste with the advantageous screen printing.

In an alternative embodiment to coating, the insulation material is a ceramic material, preferably an oxide ceramic material because of the high electrical resistance, for example aluminum oxide, magnesium oxide, zirconium oxide and/or titanium dioxide. Silicon carbide, silicon nitride, boron carbide, boron nitride and/or aluminum nitride are also possible. Other materials, such as, for example, glass or glass ceramic materials are also conceivable.

In a further advantageous embodiment of the invention, the material layer can be consolidated with at least one further material layer.

In other words, the material layer can be firmly connected and/or joined to at least one further material layer.

The material layers advantageously having baking varnish are arranged one on top of the other to form the rotor and are preferably bonded together by means of pressure and heat. This is also called baking. As result of pressure and heat, the baking varnish softens, the material layers bond together and cure, Compared to other possibilities for connection, such as welding, punching and riveting, this has the advantage that the material layers do not have any contact points that could damage the material. Moreover, a magnetic flux is not disturbed and no material stresses and material deformations develop.

The advantageously applied baking varnish enables a high degree of strength of at least two mutually consolidated material layers since the material layers are connected face to face. This reduces vibrations and noise.

In a further advantageous embodiment of the invention, the material layer has at least one third region, wherein the third region has permanent magnetic material, wherein the permanent magnetic material is connected with a material bond to the first material and/or to the second material.

The material layer preferably has a plurality of third regions (at least two). The at least one third region is preferably enclosed by the first region.

The permanent magnetic material is preferably magnetized.

In a further advantageous embodiment of the invention, the material layer has at least one material recess for the introduction of permanent magnetic material.

The at least one material recess is preferably arranged closer to the outer circumference of the material layer than to the inner circumference.

The material layer preferably has at least two, preferably more, material recesses for the introduction of permanent magnetic material. The permanent magnetic material preferably serves to form poles.

Permanent magnetic material is for example neodymium iron boron, samarium cobalt, Alnico or hard-magnetic ferrite.

If a plurality of material layers are arranged one above the other, the material recesses form pockets (in other words: openings) in the material layer structure. Permanent magnets can be inserted into these pockets. This provides the material layer structure with internal permanent magnets.

However, material layer structure with external permanent magnets is also possible.

The invention serves to increase the rotational speed by a factor of 1.5 to 10.

The invention relates to a material layer structure for a rotor of a dynamoelectric rotary machine having a plurality of material layers arranged one above the other.

In one advantageous embodiment of the invention, the plurality of material layers are arranged in the direction of a rotational axis one above the other.

In a further advantageous embodiment of the invention, the material layer structure has a cylindrical material recess along the rotational axis for attachment to a shaft.

In a further advantageous embodiment of the invention, the plurality of material layers are arranged such that the third regions having permanent magnetic material form permanent magnets that are staggered or inclined or axially parallel with respect to the rotational axis.

This reduces cogging torque and torque ripple.

The invention also relates to a method for producing a material layer, wherein the material layer comprises at least one first region having a first material and at least one second region having a second material with the following steps:
  applying a first suspension having at least one binding agent and solid particles through a first screen onto a base in order to obtain a first green body, wherein the first region is reproduced from the first screen,
  applying a second suspension having at least one binding agent and solid particles through a second screen onto a base in order to obtain a second green body, wherein the second region is reproduced from the second screen,
  joining the first green body and the second green body,
  creating a permanent material bond of the two green bodies and the solid particles by heating and/or by means of compression, in particular by means of sintering.

The suspension is preferably applied with a doctor blade.

In one advantageous embodiment of the invention, the binding agent is driven out of the first green body and/or the second green body, in particular by means of debinding, before joining and/or after joining.

The first or second screen is preferably a template for transferring desired shapes and/or outlines and/or patterns and/or recesses etc. The first or second screen can be used as often as required.

The first or second screen can be used to form the exact shape of the material layer desired. Thus, there is no waste. It is also possible to use three or more screens for a material layer.

The material layer is preferably made in one piece by heating and/or compression, in particular by means of sintering, of the two green bodies.

If three or more regions are desired, it is necessary to create and join correspondingly more green bodies.

In a further advantageous embodiment of the invention, the solid particles comprise metal particles.

The solid particles are preferably present in the form of powder. A solid particle preferably comprises at least one ferromagnetic material, in particular soft magnetic material.

For example, the soft magnetic material is iron, nickel, cobalt and/or alloys thereof. However, other magnetically conductive materials are also conceivable.

A solid particle preferably substantially has a diameter of between 0.1 and 50 μm, in particular between 0.5 and 10 μm.

The smaller the diameter of the solid particles, the thinner the material layers can be produced. For example, a suspension having solid particles with a diameter of 0.5 μm can be used to produce a thin material layer of 0.5 μm.

The powder can comprise solid particles of exclusively one material or a powder mixture comprising at least two different materials.

In a further advantageous embodiment of the invention, the solid particles of the first suspension comprise particles with a first permeability and a first degree of strength, wherein the solid particles of the second suspension comprise particles with a second permeability lower than the first permeability and a degree of strength higher than the first degree of strength.

In a further advantageous embodiment of the invention, the solid particles of a third suspension comprise permanent magnetic particles.

In a further advantageous embodiment of the invention, an insulation material is applied to the material layer on at least one layer side, preferably on both layer sides.

In a further advantageous embodiment of the invention, a varnish is applied to the material layer, in particular baking varnish.

In a further advantageous embodiment of the invention, at least one suspension is structurally viscous.

This has the advantage that the suspension is less viscous during application to the base in order to create the green body, preferably with the doctor blade, and the desired shape can be optimally transferred through the screen. When the application is finished, the green body retains the desired shape.

The invention relates to a method for producing a material layer structure for a rotor of a dynamoelectric rotary machine with the following steps:
 joining a plurality of material layers,
 baking the material layers for the mutual consolidation of the material layers.

A plurality of material layers are preferably joined or arranged one on top of the other in the direction of the rotational axis. However, the material layers can also be joined parallel to the rotational axis.

The attachment of the material layer structure to the shaft to form the rotor is preferably performed by compression. The compression is preferably mechanical compression. Herein, the material layer structure and the shaft preferably have substantially the same temperature.

Alternatively, the temperatures of the material layer structure and the shaft are different, for example, the shaft can be cooled before compression and/or the material layers can be heated.

On the one hand, the compression must be high enough to ensure that the material layers do not lift off the shaft at maximum rotational speed. On the other hand, a maximum permissible plastic deformation, in particular of the material layers, must not be exceeded.

The described material layers have a high degree of strength in the second region, which preferably adjoins the shaft thus enabling a high degree of compression and hence a high maximum rotational speed. In addition, the high maximum rotational speed can be achieved by the good magnetic properties in the first region.

The invention is particularly suitable for use with machines with magnet bearings. These are particularly suitable for high rotational speeds.

Possible fields of application of the invention are, for example, spindle motors, in particular high-speed spindle motors, turbine drives or centrifugal drives. However, the invention can also be used in other areas.

BRIEF DESCRIPTION OF THE DRAWING

The invention is described and explained below in more detail with reference to the exemplary embodiments depicted in the figures, which show.

DETAILED DESCRIPTION OF PREFERRED EMBODIMENTS

Figure 1:
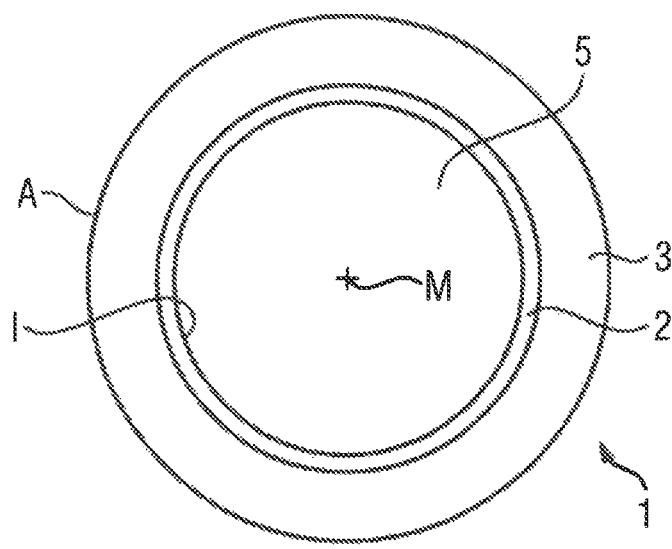
FIG. 1 a material layer according to the invention,
 FIG. 2 a possible embodiment of the material layer with recesses for internal permanent magnets,
 FIG. 3 a possible embodiment of the material layer with insulation material,
 FIG. 4 a possible embodiment of the material layer with permanent magnetic material,
 FIG. 5 a possible embodiment of a material layer structure,
 FIG. 6 a method for producing a material layer,
 FIG. 7 a method for producing a material layer structure, and
 FIG. 8 the dynamoelectric rotary machine 21.

FIG. 1 shows a material layer 1 according to the invention.

The material layer 1 has a material recess 5 arranged substantially at the layer center. The material layer 1 has a first region 3. The first region 3 has a first material with a first degree of strength.

The first material is for example pure iron, in particular pure iron with <0.01% carbon.

In the figure, the material layer 1 has an annular second region 2 arranged concentrically to the layer center M. The second region 2 has a second material with a second degree of strength higher than the first degree of strength. In the figure, an outer circumference of the second region adjoins an inner circumference of the first region.

The second material is, for example, a steel, in particular with the material number 1.8161.

The first material and the second material are connected with a material bond.

In this way, in the figure, the first region 3 and the second region 2 are also connected with a material bond.

The figure shows that the first region 3 is arranged concentrically to the layer center M. In the figure, an outline of an outer circumference A of the material layer 1 is round.

However, it is also possible for the outline of the outer circumference A of the material layer 1 to be not round.

For example, a material layer for a flower rotor has a flower-like outer circumference. The flower rotor is a rotor particularly for permanently excited synchronous machines. The permanent magnets are embodied as magnets of constant height with an enlarged air gap at the edge, Herein, an inner radius of the permanent magnets, which are preferably embodied as shell-type magnets, is preferably equal to an outer radius. The flower rotor achieves a reduction in torque ripple and togging torque.

Other outlines are also possible.

In the figure, the second region 2 defines an inner circumference I of the material layer 1. In the figure, the second region 2 adjoins the material recess 5 arranged in the layer center M.

Figure 2:
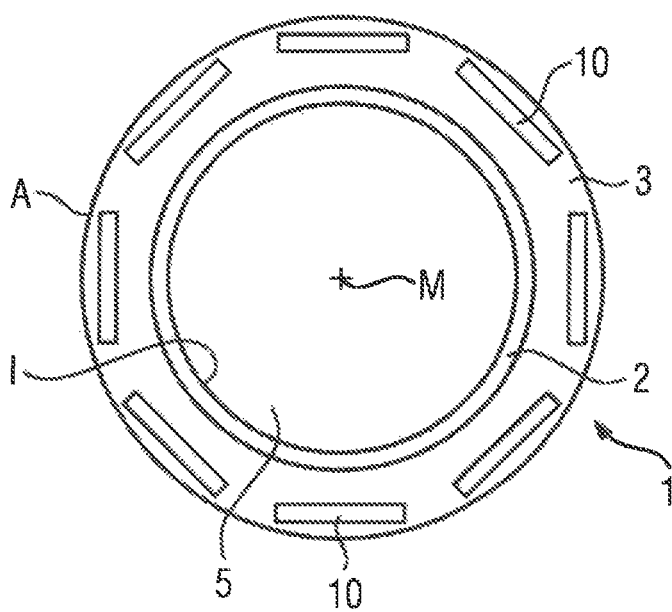

The reference characters described also apply to the following figures when used in the exemplary embodiments and will not be explained again for reasons of clarity, FIG. 2 shows a possible embodiment of the material layer 1 with recesses 10 for internal permanent magnets.

If a plurality of material layers 1 are arranged one on top of another, the recesses 10 in the material layer structure form pockets (in other words: openings), Permanent magnets can be inserted into these pockets.

The recesses 10 in each case have an outline adapted to match an outline of permanent magnets for insertion, in particular subsequently.

Preferably, the outline is adapted such that the material layer 1 or material layer structure and permanent magnet are connected in a force-filling manner.

Figure 3:
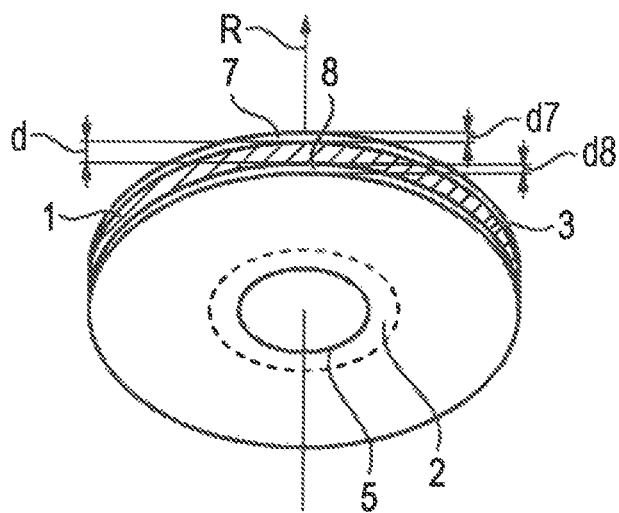

FIG. 3 shows a possible embodiment of the material layer 1 with insulation material.

The material layer 1 has a layer thickness d. Each material layer 1 preferably has an insulation material on at least one layer side. The figure shows an embodiment according to which each material layer 1 has an insulation material 7, 8 on both layer sides. In the figure, the insulation material is varnish, in particular baking varnish. This corresponds to a preferred embodiment.

The insulation material and the material layer are preferably connected with a material bond. The material layer 1 is preferably in one piece.

The material layer 1 has varnish 7 with an insulation thickness d7 on an upper layer side and varnish 8 with an insulation thickness d8 on a lower layer side.

It is also possible for the material layer 1 to have a different type of insulation material and varnish in addition. It is also possible for the material layer 1 to have a different type of insulation material on one layer side and varnish on the other layer side. It is also possible for the material layer 1 to have a mixed form of a different type of insulation material and varnish.

The figure moreover shows a centrally arranged material recess 5 (for later attachment to a shaft, see FIG. 8). A rotational axis R passes through a center point of the material recess 5.

Figure 4:
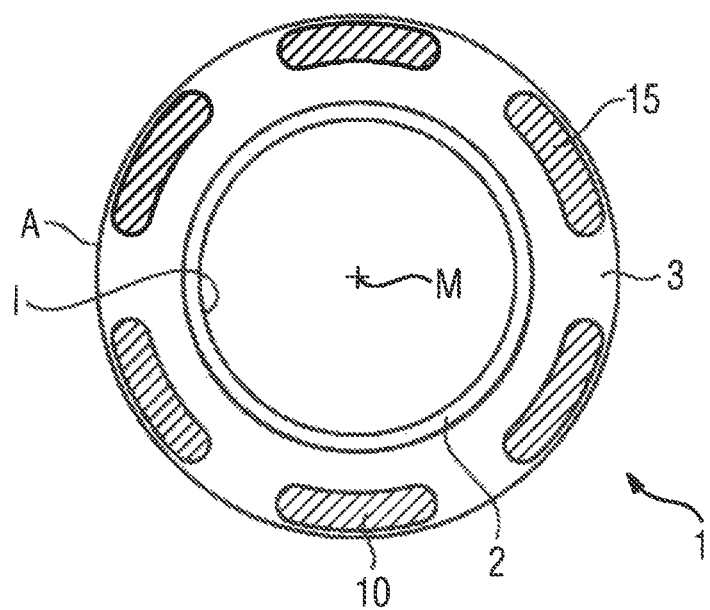

FIG. 4 shows a possible embodiment of the material layer 1 with permanent magnetic material 15.

The material layer 1 has at least one third region 15. The third region has permanent magnetic material. In the figure, the permanent magnetic material is connected with a material bond to the first material.

It is also possible for the permanent magnetic material to be connected to the second material or to the second and first material.

The figure shows six third regions 15 which are used to form poles. Herein, the third regions 15 function as internal permanent magnets.

Figure 5:
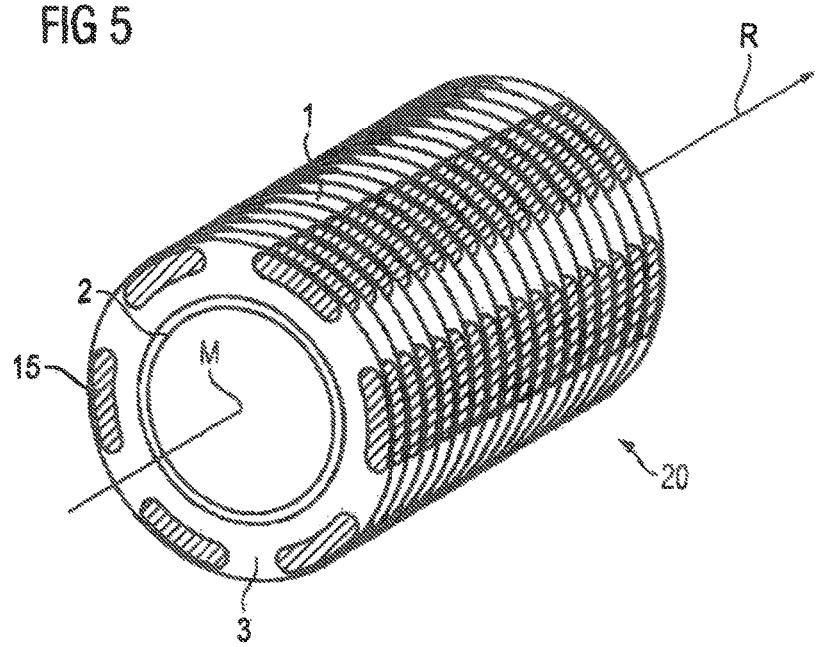

FIG. 5 shows a possible embodiment of a material layer structure 20.

The material layer structure 20 has a plurality of material layers 1 of the embodiment described in FIG. 4. In the figure, the material layers 1 are arranged along the rotational axis R.

The material layer structure 20 is preferably embodied as a rotor stack. Herein, the rotor stack is a stack comprising a plurality of substantially flat material layers, wherein the material layers touch one another. The material layers are preferably consolidated with one another.

However, the material layer structure 20 is also possible with a plurality of material layers of the embodiments described in FIG. 1, FIG. 2 and/or FIG. 3.

In the figure, the plurality of material layers 1 are also arranged such that the third regions 15 form an inclined permanent magnet arrangement. This reduces the torque ripple and the cogging torque of a dynamoelectric rotary machine that has such a material layer structure 20.

A staggered or axially parallel permanent magnet arrangement is also possible.

Figure 6:
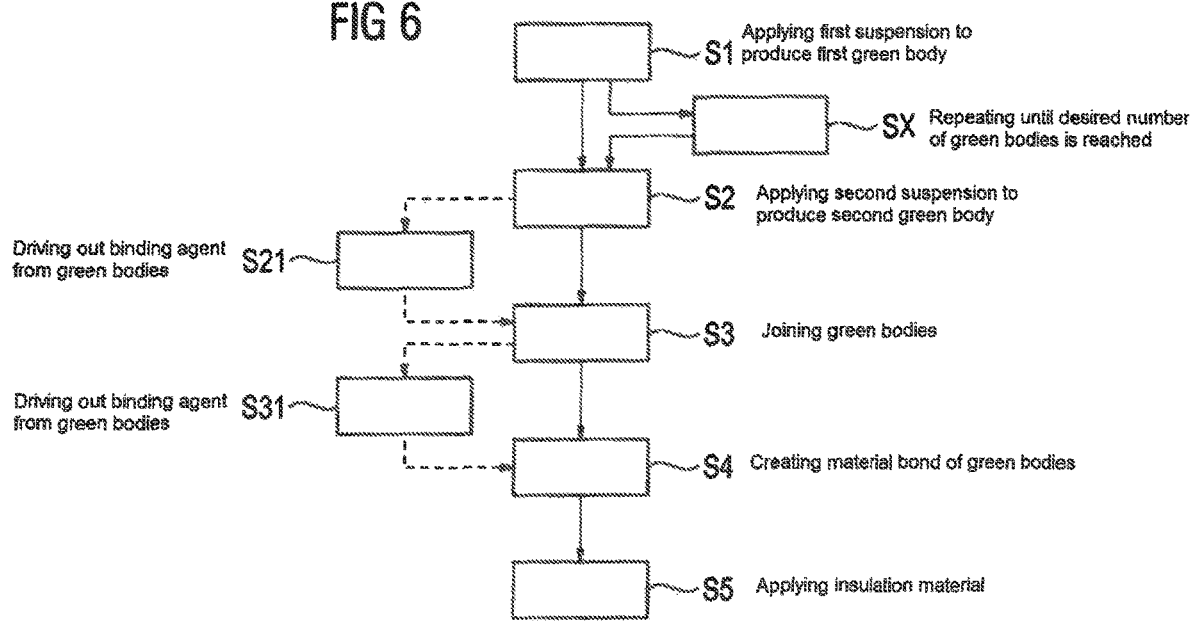

FIG. 6 shows a method for producing a material layer.

The material layer has at least one first region having a first material and at least one second region having a second material.

Therefore, in a method step S1, a first suspension having at least one binding agent and solid particles is applied through a first screen onto a base in order to obtain a first green body. The first region is reproduced by the first screen (for example the above-described first region 3).

Here, applied preferably means: the suspension is applied to the base with a doctor blade.

Then, in a method step S2, a second suspension having at least one binding agent and solid particles is applied through a second screen onto a base in order to obtain a second green body. The second region is reproduced by the second screen.

A method step SX shows that these method steps take place until a desired number of green bodies, and hence regions (for example the above-described third region 15 and/or further possible, but not described regions), are present.

Different procedures can be followed: the respective binding agent can be driven out of the first green body and/or the second (and/or further) green body before the joining in a method step S3 (see method step S21) of the first green body and the second green body (and/or further green bodies) and/or after the joining (see method step S31).

The binding agent is preferably driven out by means of debinding.

In a method step S4, a permanent material bond of the two (or more) green bodies with one another and the solid particles in the respective green body is created by heating and/or by means of compression, in particular by means of sintering.

In a method step S6, an insulation material is applied to the material layer on at least one layer side. The insulation material is preferably a varnish, in particular baking varnish.

Here, applied preferably means: insulation material is applied to the layer side with a doctor blade or the layer side is coated with a coating tool or the layer side is immersed in a vessel containing the insulation material.

The screens can be varied in a simple and inexpensive way. If the requirements for the material layer change, for example if the second region is to be wider in the radial direction, the screens can be modified. There are hardly any tool costs.

Figure 7:
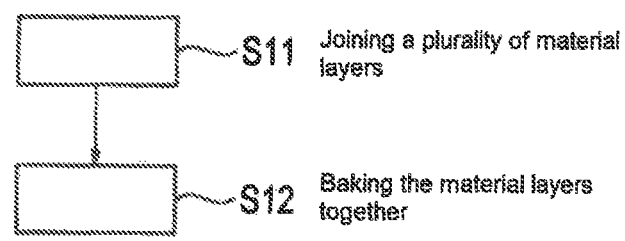

FIG. 7 shows a method for producing a material layer structure.

In a method step S11, a plurality of material layers (at least two) are joined. The production of the material layers was described in MG 6. To form the material layer structure, material layers, advantageously having baking varnish, are arranged one on top of the other.

In a method step S12, the material layers are baked together for mutual consolidation.

Figure 8:
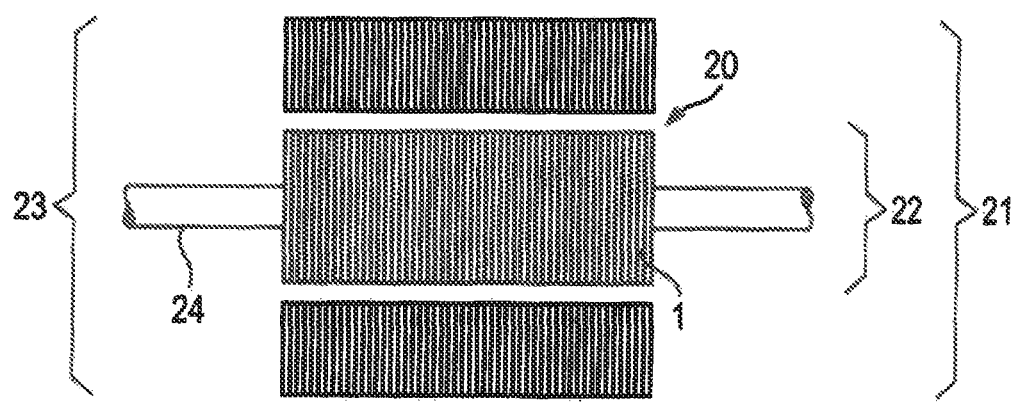

FIG. 8 shows the dynamoelectric rotary machine 21. The machine 21 has a stator 23 and a rotor 22. The rotor 22 is attached to a shaft 24. The rotor 22 has a material layer structure 20.

For example, the material layer 1 for the rotor 22 has a solid region with 1.8161 and a soft region with pure iron.

An exemplary motor with a motor weight of approximately 60 kg and an efficiency of >95% has, for example, the following data: rotor diameter approximately 100 mm, active length approximately 250 mm, power approximately 300 kW, rotational speed approximately 40000 1/min, torque approximately 72 Nm.

The invention claimed is:

1. A method for producing a material layer for a rotor of a dynamoelectric rotary machine with a rotational direction about a rotational axis arranged in a layer center of the material layer, wherein the material layer has a material recess arranged substantially at the layer center, wherein the material layer has a first region, wherein the first region has a first material with a first degree of strength, wherein the material layer has a substantially annular second region arranged concentrically to the layer center, wherein the second region has a second material with a second degree of strength higher than the first degree of strength, wherein the first material and the second material are connected with a material bond, wherein the material layer has at least a first region, comprising a first material, and at least a second region comprising a second material, said method comprising:

applying a first suspension having a binding agent and solid particles through a first screen onto a base to form a first green body, thereby reproducing from the first screen the first region of a first material with a first degree of strength;

applying a second suspension having a binding agent and solid particles through a second screen onto a base to form a second green body, thereby reproducing from the second screen the second region of a second material with a second degree of strength which is higher than the first degree of strength;

joining the first green body and the second green body such as to form the material recess substantially at a layer center, with the second region being annular and arranged concentrically to the layer center;

creating a permanent material bond of the first and second green bodies and the solid particles by heating and/or by compression, in particular by sintering, wherein the solid particles of the first suspension comprise particles with a first permeability, and the solid particles of the second suspension comprise particles with a second permeability, wherein the second permeability is lower than the first permeability and the second region adjoins the material recess arranged in the layer center and the second region on its outer circumference adjoins an inner circumference of the first region, and the first region on its inner circumference adjoins the outer circumference of the second region;

forming at least one third region enclosed by the first region, each said at least one third region comprising a pocket having permanent magnetic material; and applying a baking varnish coating on both of an upper layer side and a lower layer side of the material layer, the material layer capable of being mutually consolidated with a further said material layer by the baking varnish coating of the material layer and the further material layer to form a material layer structure.

2. The method of claim 1, wherein the solid particles comprise metal particles.

3. A material layer for a rotor of a dynamoelectric rotary machine with a rotational direction about a rotational axis arranged in a layer center of the material layer, said material layer comprising:

a material recess arranged substantially at the layer center;

a first region of a first material with a first degree of strength and a first magnetic permeability;

a substantially annular second region connected to the first material with a material bond such as to form the material recess substantially at the layer center, with the second region arranged concentrically to the layer center and having a second material with a second degree of strength which is higher than the first degree of strength and having a second magnetic permeability lower than the first magnetic permeability, wherein the second region adjoins the material recess arranged in the layer center, and the second region on its outer circumference adjoins an inner circumference of the first region, and the first region on its inner circumference adjoins the outer circumference of the second region;

at least one third region enclosed by the first region, each said at least one third region comprising a pocket having permanent magnetic material;

said material layer having an upper layer side and a lower layer side; and a baking varnish coating on both of the upper layer side and the lower layer side of the material layer capable of being mutually consolidated with a further said material layer by the baking varnish coatings of the material layer and the further material layer to form a material layer structure.

4. The material layer of claim 3, wherein the second material has a tensile strength of at least 800 MPa.

5. The material layer of claim 3, wherein the first magnetic permeability is $\mu_r > 50$, and the second magnetic permeability is $\mu_r < 5$.

6. The material layer of claim 3, wherein the material layer has a thickness of 0.5 to 500 μm.

7. The material layer of claim 3, wherein a transition from the first region to the second region is abrupt.

8. The material layer of claim 3, wherein the permanent magnetic material is connected with a material bond to the first material.

9. The material layer of claim 3, wherein the second material has a tensile strength of at least 1000 MPa.

10. The material layer of claim 3, wherein the at least one third region functions as an internal permanent magnet and forms a pole.

11. The material layer of claim 3, wherein a plurality of third regions are arranged such that the permanent magnetic material forms permanent magnets that are inclined, staggered, or axial parallel with respect to the rotational axis.

* * * * *